(12) United States Patent
Kikuchi et al.

(10) Patent No.: US 8,844,554 B2
(45) Date of Patent: Sep. 30, 2014

(54) VALVE MECHANISM OPENED IN RESPONSE TO EXTREMELY HIGH TEMPERATURE

(75) Inventors: Tetsuro Kikuchi, Tokyo (JP); Yasuaki Koiwa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 347 days.

(21) Appl. No.: 13/003,900

(22) PCT Filed: Jul. 17, 2009

(86) PCT No.: PCT/JP2009/003373
§ 371 (c)(1),
(2), (4) Date: Feb. 23, 2011

(87) PCT Pub. No.: WO2010/007796
PCT Pub. Date: Jan. 21, 2010

(65) Prior Publication Data
US 2011/0155265 A1 Jun. 30, 2011

(30) Foreign Application Priority Data
Jul. 17, 2008 (JP) ................................. 2008-185798

(51) Int. Cl.
F16K 17/38 (2006.01)
A62C 37/11 (2006.01)
A62C 35/60 (2006.01)
A62C 37/12 (2006.01)

(52) U.S. Cl.
CPC ............... *F16K 17/383* (2013.01); *A62C 37/12* (2013.01); *F16K 17/386* (2013.01); *A62C 37/11* (2013.01); *A62C 35/60* (2013.01)
USPC .................. 137/72; 137/79; 169/42

(58) Field of Classification Search
CPC ............................. F16K 17/386; A62C 37/12
USPC ............. 137/72, 79, 521, 527.2, 527; 169/42, 169/57, 37, 38, 41
See application file for complete search history.

(56) References Cited

U.S. PATENT DOCUMENTS 269,202 A * 12/1882 Grinnell .......................... 137/72
1,891,183 A * 12/1932 Rowley ........................... 169/40
(Continued)

FOREIGN PATENT DOCUMENTS

| JP | A-S46-034308 | 11/1971 |
| JP | 49-98198 U | 8/1974 |

(Continued)

OTHER PUBLICATIONS

Fire Protection Handbook, Twelfth Edition, 1962, George H. Tryon (ed.), pp. 16-170 to 16-171, National Fire Protection Association International, Boston, MA, USA.

(Continued)

*Primary Examiner* — John Rivell
(74) *Attorney, Agent, or Firm* — Oblon, Spivak, McClelland, Maier & Neustadt, L.L.P.

(57) ABSTRACT

A valve mechanism which opens in response to a high temperature includes a stopper positionable at a closed position that blocks the flow of water in a cylindrical body attached to a water supply pipe. A stopper support permits the stopper to be movable from the closed position to an open position, wherein pressure of the water in the supply pipe tends to move the stopper from the closed position to the open position. A locking unit is positionable to lock the support in a position wherein the stopper blocks the channel, and has an inclined surface inclined obliquely to the water flow direction. A heat sensitive section blocks movement of the locking unit from the locking position and includes a heat sensitive portion responsive to the temperature of an environment of the valve mechanism.

4 Claims, 9 Drawing Sheets

(56) References Cited

U.S. PATENT DOCUMENTS

| | | | | |
|---|---|---|---|---|
| 2,526,159 | A | * | 10/1950 | Rowley .................... 169/38 |
| 2,538,221 | A | * | 1/1951 | Wilber .................... 137/468 |
| 2,630,818 | A | * | 3/1953 | McRae .................... 137/75 |
| 3,651,869 | A | * | 3/1972 | Livingston et al. .......... 169/42 |
| 3,722,597 | A | * | 3/1973 | Friedman ................. 169/42 |
| 3,818,994 | A | * | 6/1974 | Livingston ................ 169/37 |
| 3,823,779 | A | * | 7/1974 | Stamm et al. ............. 169/42 |
| 3,828,855 | A | * | 8/1974 | Woodward et al. .......... 169/42 |
| 4,221,231 | A | * | 9/1980 | Harvey et al. ............. 137/72 |
| 4,556,083 | A | * | 12/1985 | Schleiter, Sr. ............. 137/514 |
| 5,159,984 | A | | 11/1992 | Hattori |
| 5,161,738 | A | | 11/1992 | Wass |
| 5,197,671 | A | | 3/1993 | Wass et al. |
| 5,213,128 | A | | 5/1993 | Baird |
| 5,275,194 | A | | 1/1994 | Gray, Jr. |
| 6,289,616 | B1 | | 9/2001 | Alvern |

FOREIGN PATENT DOCUMENTS

| | | |
|---|---|---|
| JP | 49-138694 U | 11/1974 |
| JP | 49-138695 U | 11/1974 |
| JP | 52-18421 U | 2/1977 |
| JP | 52-055298 A | 5/1977 |
| JP | 52-83399 U | 6/1977 |
| JP | 56-059072 A | 5/1981 |
| JP | 57-2063 U | 1/1982 |
| JP | 57-24372 U | 2/1982 |
| JP | 58-40667 U | 3/1983 |
| JP | 59-64159 U | 4/1984 |
| JP | 59-113572 U | 7/1984 |
| JP | 61-168366 U | 10/1986 |
| JP | 4-25761 U | 2/1992 |
| JP | 7-502324 A | 3/1995 |
| JP | 7-507382 A | 8/1995 |
| JP | 7-303713 A | 11/1995 |
| JP | 8-308953 A | 11/1996 |
| JP | 10-108917 A | 4/1998 |
| JP | 3131593 U | 4/2007 |

OTHER PUBLICATIONS

International Search Report for PCT Patent App. No. PCT/JP2009/003373 (Oct. 20, 2009).

Japanese Office Action dated Feb. 12, 2014 issued in Japanese Patent Application No. 2010-520783 w/partial English translation.

* cited by examiner

VALVE MECHANISM OPENED IN RESPONSE TO EXTREMELY HIGH TEMPERATURE

This application is a national phase entry under 35 U.S.C. §371 of PCT Patent Application No. PCT/JP2009/003373, filed on Jul. 17, 2009, which claims priority under 35 U.S.C. §119 to Japanese Patent Application No. 2008-185798, filed Jul. 17, 2008, both of which are incorporated by reference.

TECHNICAL FIELD

The present invention relates to a valve mechanism that is opened in the case where temperature of a plant building or an establishment is increased to an extremely high level and that then supplies fire-fighting water or cooling water.

BACKGROUND ART

In typical, a sprinkler head fixture illustrated in FIG. 9 and disclosed in the Patent Document 1 is known as a valve mechanism that is opened in response to extremely high temperature due to the occurrence of fire or the like and that then supplies fire-fighting water.

The above sprinkler head fixture includes a body H having a T-shaped joint form, a connection opening A that is provided at an end of the sprinkler head fixture and that is connected to a supply pipe through which fire-fighting water is supplied, an attachment opening J that is coaxially provided for a heat sensitive section D at the other end of the sprinkler head fixture, and a connection opening B that is positioned at an intermediate portion between the two ends and that is connected to a pipe connected to a water spray head (not illustrated) such as a sprinkler head.

A sprinkler head is attached to the attachment opening J provided for the heat sensitive section D. The valve disc C is provided at the side of the connection opening A connected to a pipe through which fire-fighting water is supplied, thereby blocking a liquid in the pipe. A rod A1 is formed so as to be integrated with the valve disc C and has one end that is inserted into a guiding portion of the sprinkler head.

In the case where temperature is increased at an extremely high level due to the occurrence of fire or the like, a glass bulb as the heat sensitive section D that is provided to the sprinkler head is broken. The valve disc C is pressed to the glass bulb-provided side owing to water pressure or the like in a pipe through which fire-fighting water is supplied, and the valve disc C and the rod A1 are therefore moved to the glass bulb-provided side.

The movement of the valve disc C enables the fire-fighting water to be supplied to the connection opening B that is provided at the intermediate portion of the body H and that is connected to a pipe connected to a water spray head. The fire-fighting water is discharged from the water spray head (not illustrated), thereby suppressing or extinguish fire.

Patent Document 1: Japanese Unexamined Patent Application Publication No. 10-108917

DISCLOSURE OF INVENTION

Problems to be Solved by the Invention

In the configuration of the above sprinkler head fixture, a load due to water pressure in a pipe A through which the fire-fighting water is supplied to be discharged from the sprinkler head is applied in a direction in which the valve disc C is opened, and therefore the rod A1 that is formed so as to be integrated with the valve disc C serves to directly apply the load to the glass bulb of the sprinkler head.

Although the sprinkler head fixture has advantages of being formed with the small number of components and of a simple configuration, a force to be applied to a valve is increased in the case where the sprinkler head fixture has a large bore diameter. Then, the strength of the glass bulb becomes insufficient to support the above load, and such a configuration cannot be applied to one of a type having a large bore diameter.

In order to overcome the above problem, it is an object of the invention to provide a valve mechanism, the valve mechanism having a simple configuration, being available for a type having a large bore diameter, and being able to be opened in response to extremely high temperature to supply fire-fighting water or cooling water.

Means for Solving the Problems

In order to achieve the above object, according to a first aspect of the invention, there is provided a valve mechanism opened in response to extremely high temperature, the valve mechanism including: a cylindrical body that is attached to an end of a supply pipe connected to a water source; a stopper that blocks a channel inside the body; a support that is disposed inside the body and that supports the stopper by pressing the stopper to a side of the supply pipe; a locking unit that serves to lock the support in a normal state and that unlocks the support in the case of extremely high temperature; and a heat sensitive section that releases the locking unit in the case where temperature of environment is increased to an extremely high level.

According to a second aspect of the invention, in the valve mechanism opened in response to extremely high temperature according to the first aspect, the stopper is pressed to the side of the supply pipe by a pressing unit, and the pressing unit is provided to the support so as to face the supply pipe and so as to protrude from an adjustable position.

According to a third aspect of the invention, in the valve mechanism opened in response to extremely high temperature according to the first or second aspect, the support has a bearing that is formed so as to be pivotally supported inside the body, a shaft is inserted into the bearing with the result that the support is configured so as to be rotatable in the body, and one end of a locking bar as the locking unit engages with an edge of the support to prevent rotation of the support, the edge being positioned opposite to the bearing.

According to a fourth aspect of the invention, in the valve mechanism opened in response to extremely high temperature according to the third aspect, the locking bar is provided so as to penetrate from the inside of the body to the outside, and the other end of the locking bar contacts the heat sensitive section that is provided outside the body.

According to a fifth aspect of the invention, in the valve mechanism opened in response to extremely high temperature according to the first or second aspect: the support has a vertical hole which is formed at the center of the support and into which one end of a rod is inserted, the rod having a stepped side surface; a horizontal hole is formed so as to penetrate from the hole to a side surface of the support; any one of a hole and a groove is formed in the inner surface of the body at a height the same as the height of the position of the horizontal hole; a first ball is provided between the horizontal hole and any of the hole and the groove; an interface member is inserted into the horizontal hole so as to contact the first ball and a side surface of the rod; and the other end of the rod contacts the heat sensitive section attached to the support.

According to a sixth aspect of the invention, in the valve mechanism opened in response to extremely high temperature according to the fifth aspect: a second ball is provided between the rod and the interface member, the rod being inserted into the vertical hole of the support; and the second ball contacts a side surface of the rod.

According to a seventh aspect of the invention, in the valve mechanism opened in response to extremely high temperature according to the first aspect, the heat sensitive section is configured such that a column-shaped cylinder having a bottom is filled with a soluble alloy and such that a plunger slidable inside the cylinder contacts the soluble alloy.

According to an eighth aspect of the invention, in the valve mechanism opened in response to extremely high temperature according to the first aspect, the heat sensitive section is an enclosed-type sprinkler head.

According to a ninth aspect of the invention, in the valve mechanism opened in response to extremely high temperature according to the first aspect, the stopper has an outer surface having a cylindrical shape with the bottom so as to be slidable on an inner surface of the body, the support is attached to the discharge opening-side end of the stopper, a periphery of the support is positioned on an edge face of a ring as a locking unit with the result of being locked, and an outer surface of the ring is bonded to an inner surface of the body by using a soluble alloy as the heat sensitive section.

According to a tenth aspect of the invention, in the valve mechanism opened in response to extremely high temperature according to the ninth aspect, any one of copper and copper alloy is used to form the ring.

Advantages

According to the first aspect of the invention, a valve mechanism opened in response to extremely high temperature can be provided in a simple configuration, the extremely high temperature being caused by the occurrence of fire or by increased pressure in an establishment.

According to the second aspect of the invention, a mechanism that applies force in order to press the stopper to the side of the supply pipe is provided, so that sealing properties are improved.

According to the third aspect of the invention, the support has a structure of a swing valve, and the locking unit prevents rotation of the edge of the support, such an edge being positioned at the side opposite to the pivotally supported side. Therefore, the support can be disposed at a predetermined position.

According to the fourth aspect of the invention, one end of the locking bar as the locking unit is configured so as to engage with the support, and the other end is configured so as to contact the heat sensitive section. Accordingly, the heat sensitive section is operated with the result that the locking bar is moved to the side of the heat sensitive section, thereby being able to release the locking unit.

According to the fifth aspect of the invention, a configuration is employed, in which the support falls down at the time of operation. Therefore, as compared with the third aspect of the invention, there is provided an advantage in which the body can be formed in a small size.

According to the sixth aspect of the invention, the second ball is provided between a side surface of the rod and the interface member that is inserted into the horizontal hole of the support, and frictional resistance can be therefore decreased during the movement of the rod to the side of the heat sensitive section.

According to the seventh aspect of the invention, the heat sensitive section can be provided in a simple configuration with a decreased number of components.

According to the eighth aspect of the invention, the enclosed-type sprinkler head can be used as the heat sensitive section.

According to the ninth aspect of the invention, the ring as the locking unit is bonded to the inner surface of the body by using the soluble alloy. Therefore, the number of components can be decreased, and a simple configuration can be provided.

According to the tenth aspect of the invention, copper or copper alloy that is easily bonded to the soluble alloy is employed to form a locking unit, so that the ring can be tightly bonded to the body.

BEST MODES FOR CARRYING OUT THE INVENTION

In a valve mechanism of embodiments of the invention, a stopper and a support that is provided inside a body to press the stopper are individually formed, and a pressing unit is provided to press the stopper to the side of a supply pipe. Specifically, in the pressing unit, an external screw is threaded into an internal screw that is formed in the support, and then an end of the external screw can press the stopper to the side of the supply pipe.

Furthermore, the support may have a structure of a swing check valve and may therefore rotate at the time of operation, or the stopper may be configured so as to fall down at the time of the operation and so as to be then ejected to the outside of the body.

The locking unit is disposed between the support and the heat sensitive section and holds the support at a predetermined position inside the body. The locking unit moves to the side of the heat sensitive section as a result of the operation of the heat sensitive section, thereby unlocking the support. A configuration may be employed, in which a plurality of the locking units are provided to the support.

The heat sensitive section operates in response to extremely high temperature and contacts the locking unit in a normal state. An enclosed-type sprinkler head or a cylinder is attached as the heat sensitive section to the outside of the body or to the support, the cylinder being filled with a soluble alloy. Otherwise, a shape memory alloy can be used, the shape memory alloy deforming in the case where temperature reaches a predetermined level.

In order to protect the heat sensitive section from external shock, the heat sensitive section can be covered with a lattice-shaped member, thereby protecting the heat sensitive section from an external force.

In the cylindrical body, the stopper is provided at the side to be connected to the supply pipe, and the ring is provided at the side of the discharge opening relative to the stopper. In the case where the valve mechanism is configured as a result of bonding the outer surface of the ring to the inner surface of the body by using a soluble alloy, usage of copper or copper alloy as a ring material can improve the bonding strength of the soluble alloy.

Although copper or copper alloy is also preferably used to form the inner surface of the body to be bonded to the ring, only a member to be bonded to the ring can be formed using the copper or the copper alloy in view of economic efficiency. Otherwise, the ring and the body or only the ring-bonded member of the inner surface of the body can be coated with a material exhibiting good bonding properties to the soluble alloy, such as nickel, copper, or tin, by plating processing.

In order to enable heat to be easily absorbed to the cylinder and ring as the heat sensitive section, an uneven portion can be provided to increase a surface area, and a heat collector can be provided in the form of a thin plate. Furthermore, the soluble alloy to be used for the heat sensitive section may be an alloy that is produced by blending two or more types of metal or may be an alloy that is produced using only one type of metal. The soluble alloy to be employed has a melting temperature of lower than or equal to 300° C.

EMBODIMENT 1

Figure 1:
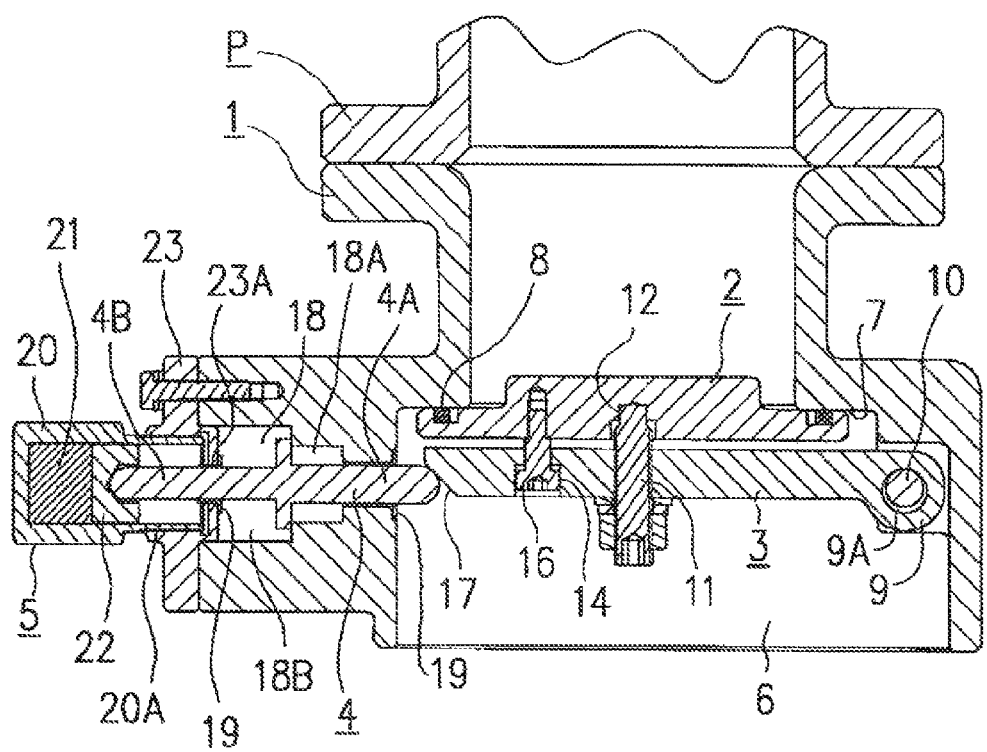
FIG. 1 is a cross-sectional view illustrating a valve mechanism of an embodiment 1.
Figure 2:
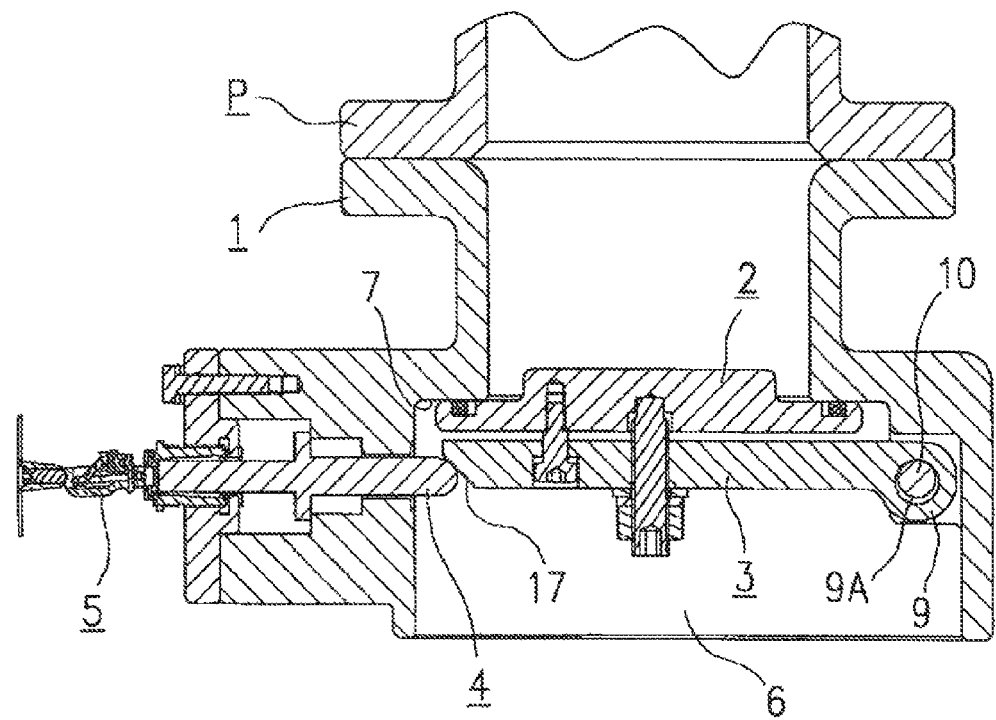
FIG. 2 illustrates a modification of the embodiment 1.
Figure 3:
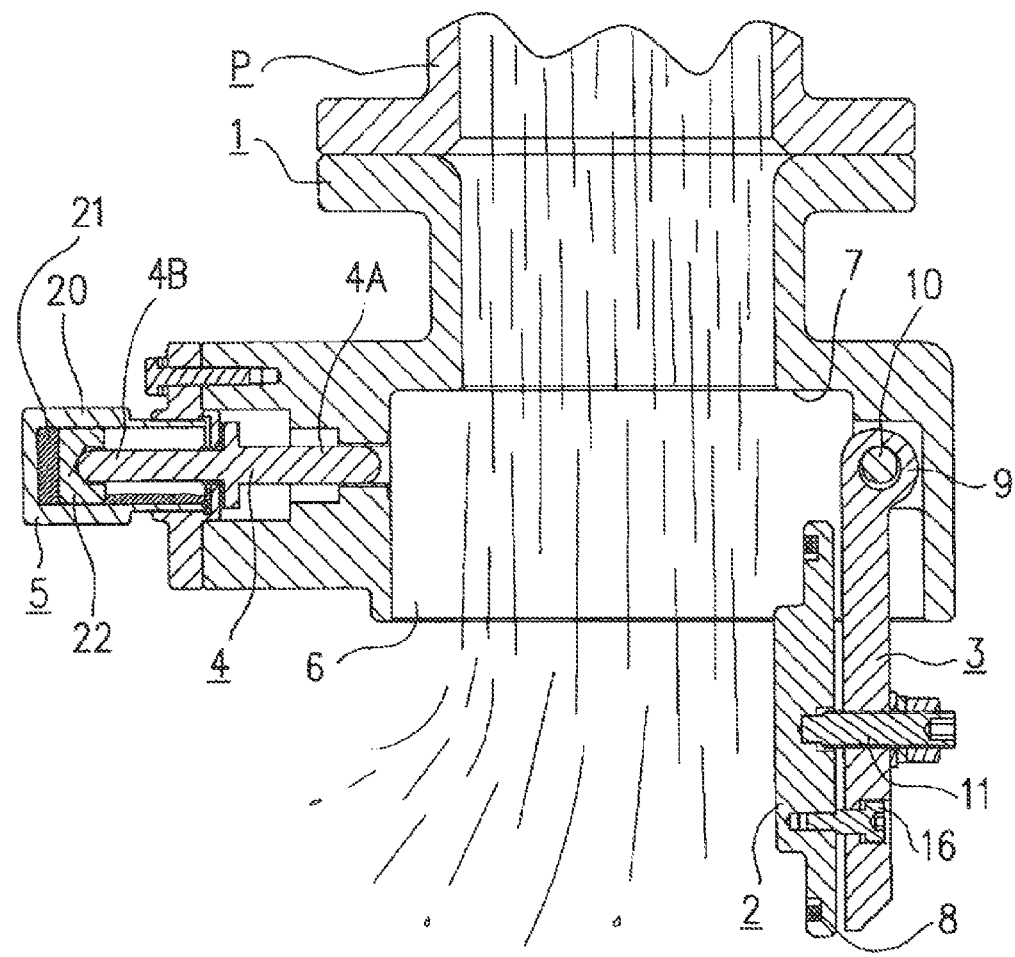
FIG. 3 illustrates an operating state of the valve mechanism of the embodiment 1.

An embodiment 1 of the invention will be hereinafter described with reference to FIGS. 1 to 3. FIG. 1 is a cross-sectional view illustrating a valve mechanism of the embodiment 1. FIG. 2 illustrates a modification of the embodiment 1. FIG. 3 illustrates an operating state of the valve mechanism of the embodiment 1.

The valve mechanism of the embodiment 1 illustrated in FIG. 1 includes a body 1, a stopper 2, a support 3, a locking bar 4 as a locking unit, and a heat sensitive section 5.

The body 1 has a cylindrical shape. In the drawing, the upper portion of the body 1 is connected to a supply pipe P, and the lower portion of the body 1 functions as a discharge opening 6 which discharges a liquid supplied through the supply pipe P. A step 7 is formed inside the body 1, and the inner diameter of the body 1 is configured so as to be larger at the side of the discharge opening 6 relative to the side of the supply pipe P.

The stopper 2 has a planar shape, and an annular sealing member 8 is provided on one surface of the stopper 2. The surface on which the sealing member 8 is provided is seated on the step 7.

The support 3 has a planar shape. A bearing 9 is formed at part of the periphery of the support 3, and a shaft 10 is inserted into the bearing 9. The shaft 10 is fixed to the discharge opening 6-side of the body 1, and the support 3 is configured so as to be able to rotate round the shaft 10. A gap 9A is appropriately formed between the hole of the bearing 9 and the shaft 10.

The stopper 2 is disposed between the support 3 and the step 7. A bolt 11 is threaded into an internal screw that is formed at the center of the support 3, thereby pressing the stopper 2 to the side of the supply pipe P. A hole 12 is formed in the stopper 2 so as to be positioned at the bolt 11-pressing side.

An amount in which the bolt 11 protrudes to the side of the stopper 2 can be adjusted, and a load which is applied in order to press the stopper 2 against the step 7 can be appropriately adjusted. A stepped bolt 16 is threaded into an inner screw 15 through a hole 14 formed in the support 3, the inner screw 15 being formed in the support 3-side surface of the stopper 2. Therefore, the stopper 2 rotates in conjunction with the rotation of the support 3.

An inclined plane 17 is formed at an edge of the support 3 so as to be positioned opposite to the bearing 9, the inclined plane 17 being inclined from a side surface to the discharge opening 6. The inclined plane 17 engages an end 4A of the locking bar 4.

The locking bar 4 is inserted into a through hole 18 that is formed in a side surface of the body 1. A step is formed inside the through hole 18, and a hole 18A is formed at the side of the inner periphery of the body 1 so as to have a slightly larger diameter relative to the outer diameter of the one end 4A of the locking bar 4. The locking bar 4 is configured so as to be able to slide inside the hole 18A. In order to provide smooth sliding, a cylindrical sleeve 19 is provided inside the hole 18A.

A hole 18B is formed at the peripheral side of the body 1 and has a diameter larger than that of the hole 18A. The heat sensitive section 5 is provided at an end of the hole 18B. The heat sensitive section 5 has a cylinder 20 having a column-like shape with a bottom, and the cylinder 20 is filled with a soluble alloy 21. In the case where temperature is increased to a predetermined level, the soluble alloy 21 is melted and then outflows to the outside of the cylinder 20. Melting temperature is varied depending on preparation of various types of metal. The soluble alloy 21 which exhibits a temperature adequate to an installation location is used. Otherwise, in dependence on usage environment or melting temperature conditions, only one type of metal may be used in place of an alloy.

A plunger 22 is inserted into the cylinder 20 filled with the soluble alloy 21 so as to be able to slide inside the cylinder 20. The other end 4B of the locking bar 4 contacts the plunger 22. An external screw 20A is formed on the opening-side outer surface of the cylinder 20, and a lid 23 having an internal screw which thredably engages with the external screw 20A is attached to the edge face of the hole 18B. The lid 23 has a hole 23A in which the other end 4B of the locking bar 4 can slide, and the sleeve 19 is provided as in the case of the hole 18A that is provided at the side of the inner surface of the body 1.

In the locking bar 4, the external screw 20A of the cylinder 20 is threaded into the internal screw of the lid 23, so that the one end 4A of the locking bar 4 is pressed against the inclined plane 17 of the support 3, thereby preventing the rotation of the support 3 to the side of the discharge opening 6.

In the embodiment 1, a configuration illustrated in FIG. 2 can be employed, in which the heat sensitive section 5 is replaced with a sprinkler head as disclosed in Japanese Unexamined Patent Application Publication Nos. 7-284545 and 11-123250.

Next, the operation of the valve mechanism of the embodiment 1 will be described.

The body 1 is connected to the supply pipe P. The supply pipe P is filled with water, or in the case where a dry-type pipe is employed, the supply pipe P is filled with air. In the cases where fire breaks out and where temperature of environment is then increased to an extremely high level, the soluble alloy 21 that fills the inside of the cylinder 20 of the heat sensitive section 5 melts and then outflows to the outside of the cylinder 20 through a gap between the plunger 22 and the inside of the cylinder 20. The outflow of the soluble alloy 21 eliminates a pressing force applied to the other end 4B of the locking bar 4. The support 3 rotates at the side of the one end 4A, so that the inclined plane 17 presses the tip of the one end 4A to the side of the heat sensitive section 5. Therefore, the locking bar 4 moves to the side of the heat sensitive section 5, so that the support 3 is released from a locked state formed by the locking bar 4.

In the case where the locked state of the support 3 is released, the support 3 rotates to the side of the discharge opening 6 as illustrated in FIG. 3, and the stopper 2 also rotates along with the support 3 to be separated from the step 7. Accordingly, the supply pipe P is opened, and water of a water source is discharged from the discharge opening 6, thereby suppressing a state of the extremely high temperature by using the water to prevent the damage from spreading. In the case of employment of a dry-type pipe, water begins to be supplied from a water source, and then the water starts to be discharged from the discharge opening.

EMBODIMENT 2

Figure 4:
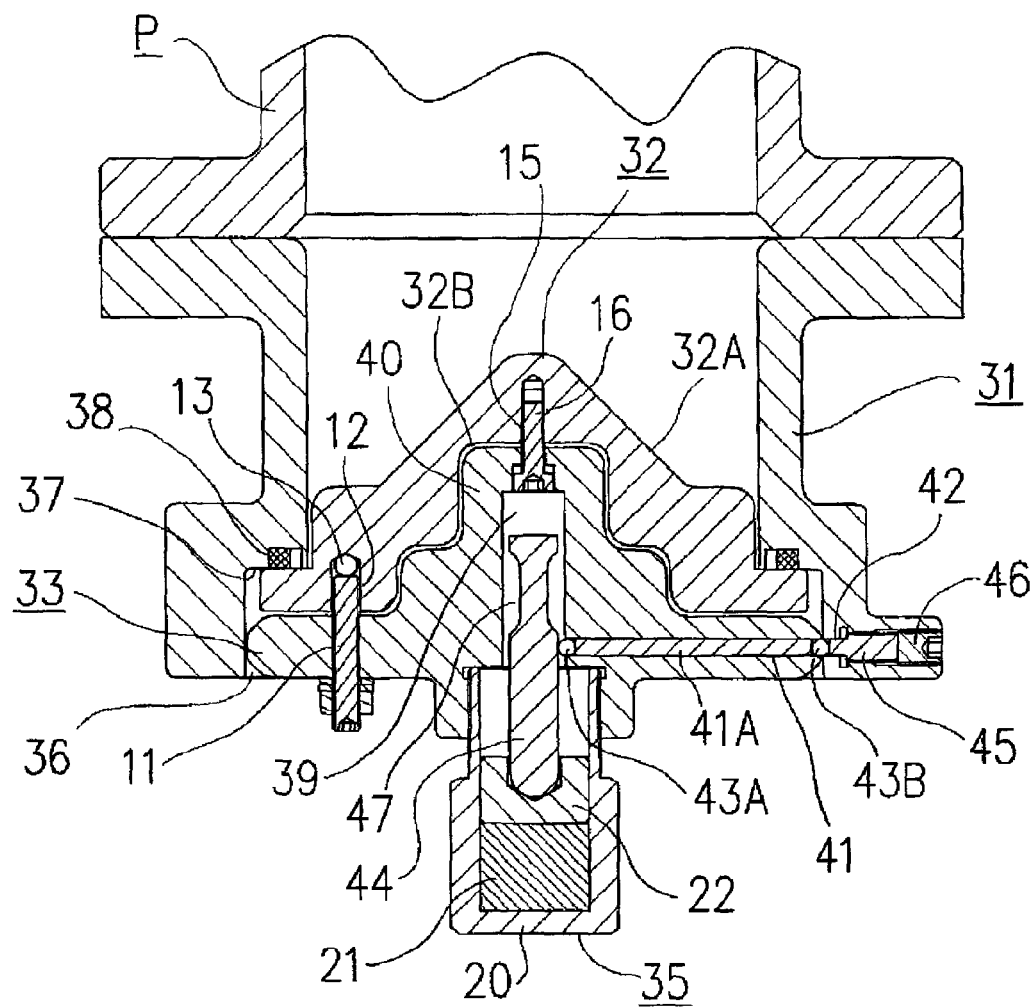
FIG. 4 is a cross-sectional view illustrating a valve mechanism of an embodiment 2.
Figure 5:
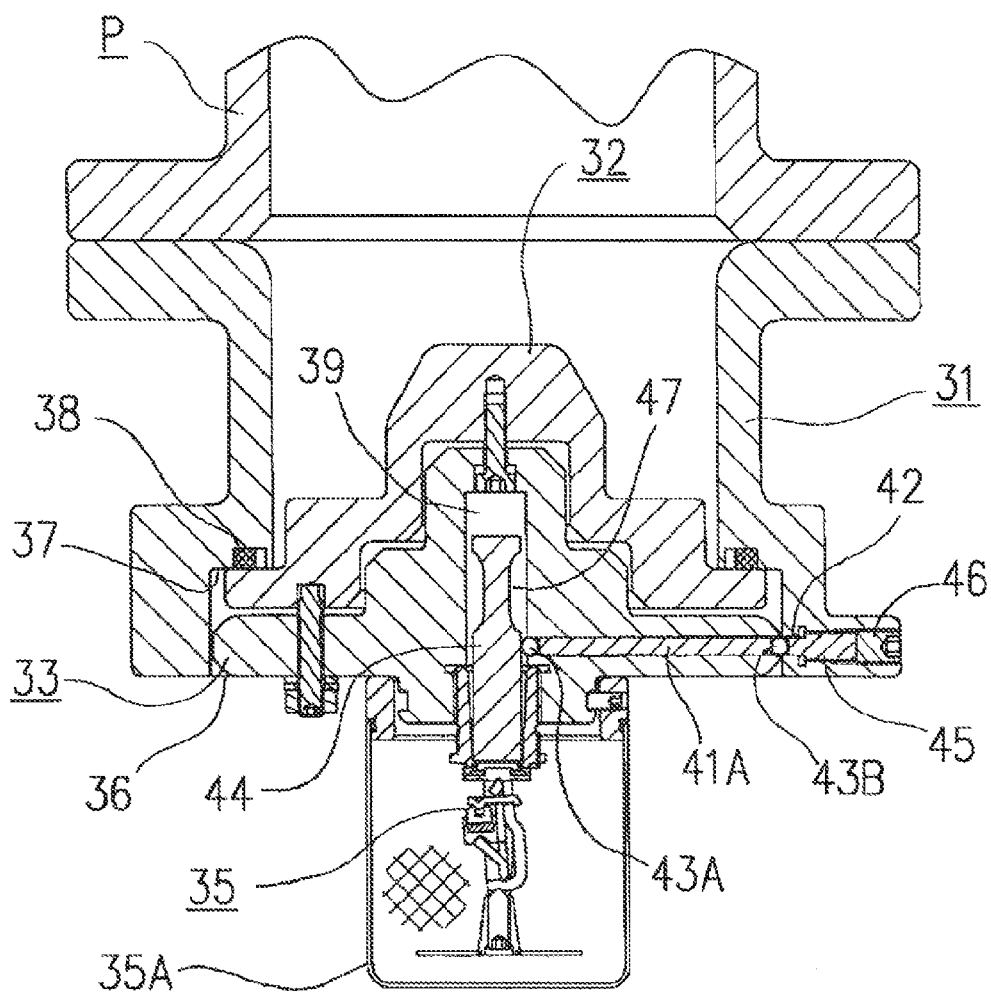
FIG. 5 illustrates a modification of the embodiment 2.
Figure 6:
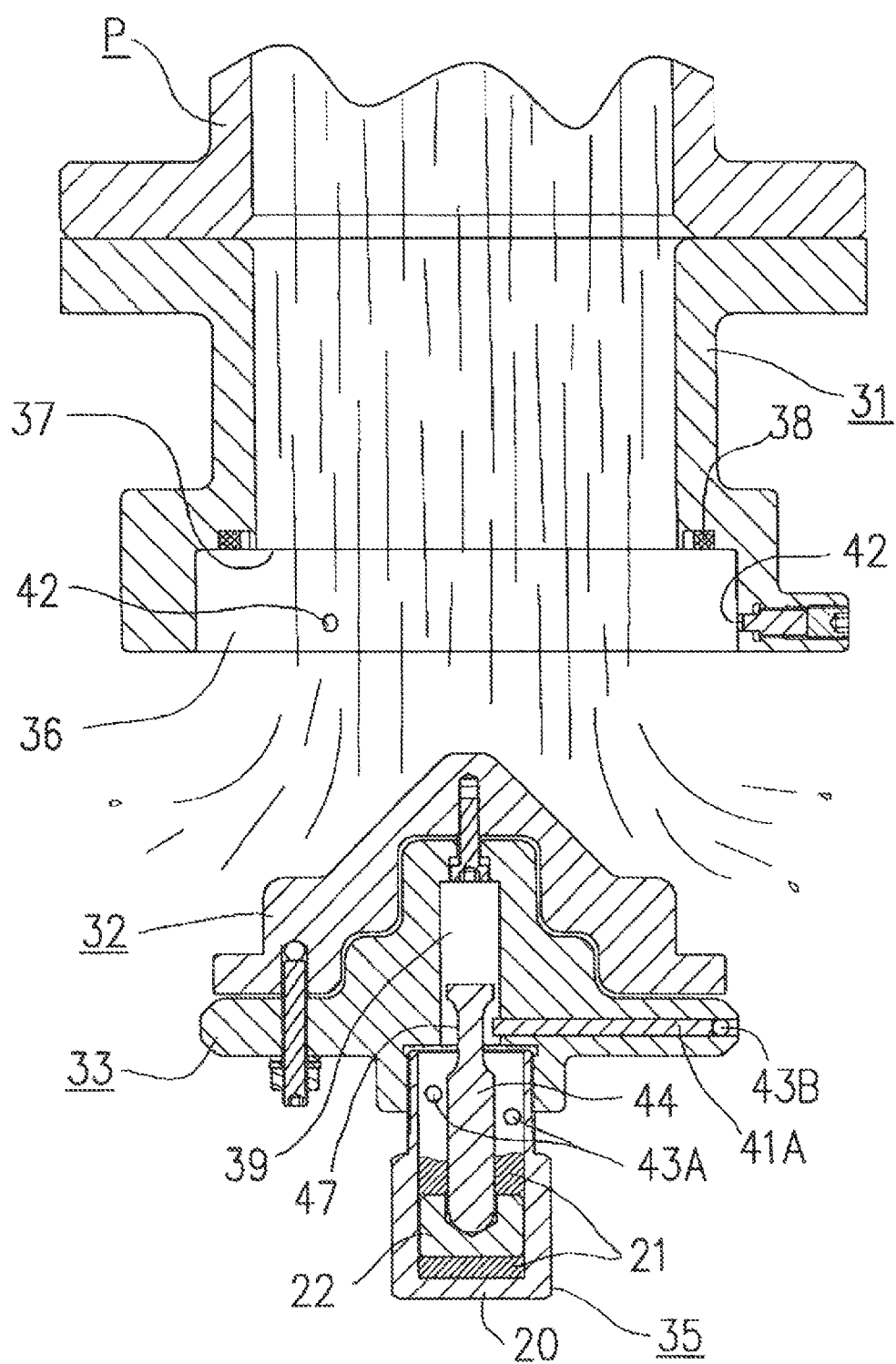
FIG. 6 illustrates an operating state of the valve mechanism of the embodiment 2.

An embodiment 2 will be hereinafter described with reference to FIGS. 4 to 6. FIG. 4 is a cross-sectional view illustrating a valve mechanism of the embodiment 2. FIG. 5 illustrates a modification of the embodiment 2. FIG. 6 illustrates an operating state of the valve mechanism of the embodiment 2.

The valve mechanism of the embodiment 2 illustrated in FIG. 4 includes a body 31, a stopper 31, a support 33, a locking unit 34, and a heat sensitive section 35. Components having the same configuration as described in the embodiment 1 are referenced by the same numeral, and detailed description thereof is omitted.

The body 31 has a cylindrical shape. In the drawing, the upper portion of the body 31 is connected to a supply pipe P, and the lower portion of the body 31 functions as a discharge opening 36 which discharges a liquid supplied through the supply pipe P. A step 37 is formed inside the body 1, and the inner diameter of the body 1 is configured so as to be larger at the side of the discharge opening 36 relative to the side of the supply pipe P.

The stopper 32 has a planar shape, and an annular sealing member 38 is provided on one surface of the stopper 32. The sealing member 38 is seated on the step 37. The surface, on which the sealing member 38 is formed, of the stopper 32 protrudes to the side of the supply pipe P, and a protrusion 32A is therefore formed. The protrusion 32A has a rear surface that is formed so as to be hollowed to the side of the supply pipe P, and the support 33 is fitted into the hollowed portion that serves as a hollow 32B.

The support 33 has a planar shape and has the outer diameter slightly smaller than the inner diameter of a discharge opening 36 of the body 1. The support 33 is accommodated in the discharge opening 36. A hole 39 is formed at the center of the support 33. A protrusion 40 is formed so as to surround the hole 39 and so as to be able to be inserted into the hollow 32 of the stopper 32. A gap is formed between the protrusion 40 and the hollow 32B.

A plurality of lateral holes 41 are formed in a side surface of the support 33 so as to extend from the hole 39 to the side surface of the support 33. A hole 42 is formed in the inner surface of the discharge opening 36 at a position corresponding to the hole 41 so as to be coaxial to the hole 41. A spacer 41A is slidably inserted into the hole 41, and balls 43A and 43B are individually provided at the two ends of the spacer 41A.

The ball 43A is positioned at the side of the hole 39 that is formed at the center of the support 33, and the position of the ball 43A is adjusted so as to contact a side surface of a rod 44 that is inserted into the hole 39. Therefore, the ball 43A is prevented from moving to the side of the hole 39. The ball 43B is positioned at the side of the hole 42 of the body 31 and is adjusted so as to be located between the hole 41 and the hole 42. The ball 43B is prevented from moving to the side of the hole 42 by a blocking piece 45 and a plug 46, the blocking piece 45 being provided inside the hole 42, and the plug 46 being threaded into an internal screw formed inside the hole 42.

The ball 43B serves to lock the support 33 with respect to the hole 42 of the body 1. A configuration in which the movement of the balls 43A and 43B is prevented with the result that the ball 43B serves to lock the support 33 with respect to the body 1 forms the locking unit 34.

The gap is formed between the support 33 and the stopper 32 as described above. A plurality of inner screws are formed in the support 33 as in the case of the embodiment 1. The bolt 11 is threaded into the inner screw, and an end of the bolt 11 contacts a ball 13 disposed in the hole 12 formed in the stopper 2. Therefore, the stopper 32 is pressed against the step 37.

Furthermore, a stepped bolt 16 is threaded from the hole 14 into the internal screw 15 formed at the bottom of the hollow 32B of the stopper 32, the hole 14 being formed in the support 33. Therefore, in the case where the locking unit 34 that serves to lock the support 33 with respect to the body 31 is released, the support 33 falls down along with the stopper 32.

The rod 44 that is inserted into the hole 39 has a column-like shape and can vertically move in the hole 39. A narrow portion 47 is formed on the side surface of the rod 44 at a position near the stopper 32 relative to a position at which the ball 43A contacts the rod 44. The lower end of the rod 44 contacts the heat sensitive section 5. In the case where the heat sensitive section 5 operates in response to heat, the rod 44 moves to the side of the heat sensitive section 5, and the position of the narrow portion 47 therefore shifts to the position of the ball 43A. The side surface, which has prevented the movement of the ball 43A, of the rod 44 shifts, and then the narrow portion 47 reaches the position of the ball 43A. Then, the ball 43A comes to be able to move to the side of the hole 39.

The heat sensitive section 35 includes the cylinder 20, the soluble alloy 21, and the plunger 22, the cylinder 20 having the same configuration as employed in the embodiment 1. The cylinder 20 is connected to an end of the hole 39 of the support 33. An end of the rod 44 disposed inside the hole 39 contacts the plunger 22. Furthermore, as illustrated in FIG. 5, the heat sensitive section 35 can be replaced with a sprinkler head as in the case of the embodiment 1. Furthermore, a lattice-shaped cover 35A can be provided to protect the sprinkler head from an external force.

The operation of the valve mechanism of the embodiment 2 will be hereinafter described.

The body 1 is connected to the supply pipe P. The supply pipe P is filled with water, or in the case where a dry-type pipe is employed, the supply pipe P is filled with air. In the cases where fire breaks out and where temperature of environment is then increased to an extremely high level, the soluble alloy 21 that fills the cylinder 20 of the heat sensitive section 35 melts and then outflows to the outside of the cylinder 20. The outflow of the soluble alloy 21 allows the rod 44 to move to the bottom side of the cylinder 20. Then, the position of the narrow portion 47 of the rod 44 shifts to the position of the ball 43A, and then the ball 43A moves to the side of the hole 39. Accordingly, the spacer 41A and the ball 43B also move to the side of the side of the hole 39.

The movement of the ball 43B to the side of the hole 39 of the support 33 releases a locked state between the support 33 and the body 31. Then, as illustrated in FIG. 6, the support 33 and the stopper 32 are ejected to the outside of the body 31. Accordingly, the supply pipe P is opened, and water of a water source is discharged from the discharge opening 36, thereby suppressing a state of the extremely high temperature by using the water to prevent the damage from spreading. In the case of employment of a dry-type pipe, water begins to be supplied from a water source, and then the water starts to be discharged from the discharge opening.

Figure 7:
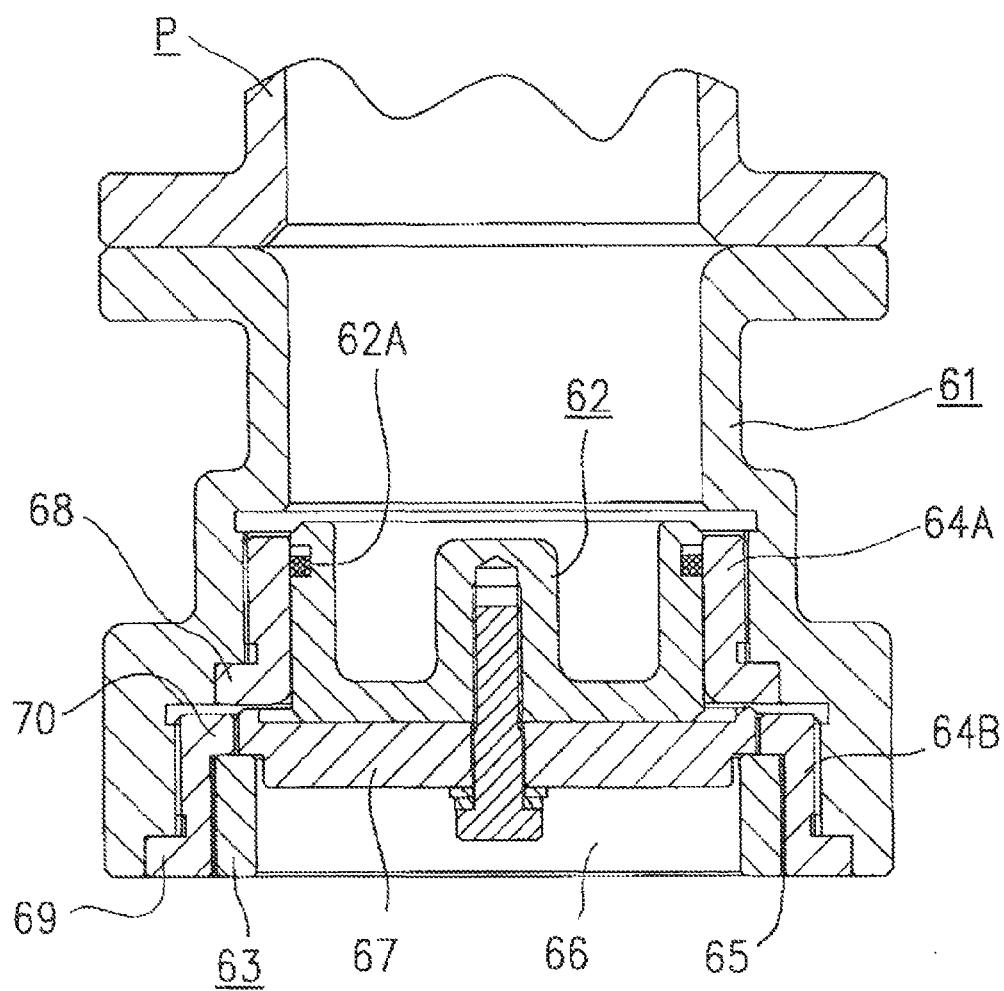
FIG. 7 is a cross-sectional view illustrating a valve mechanism of an embodiment 3.
Figure 8:
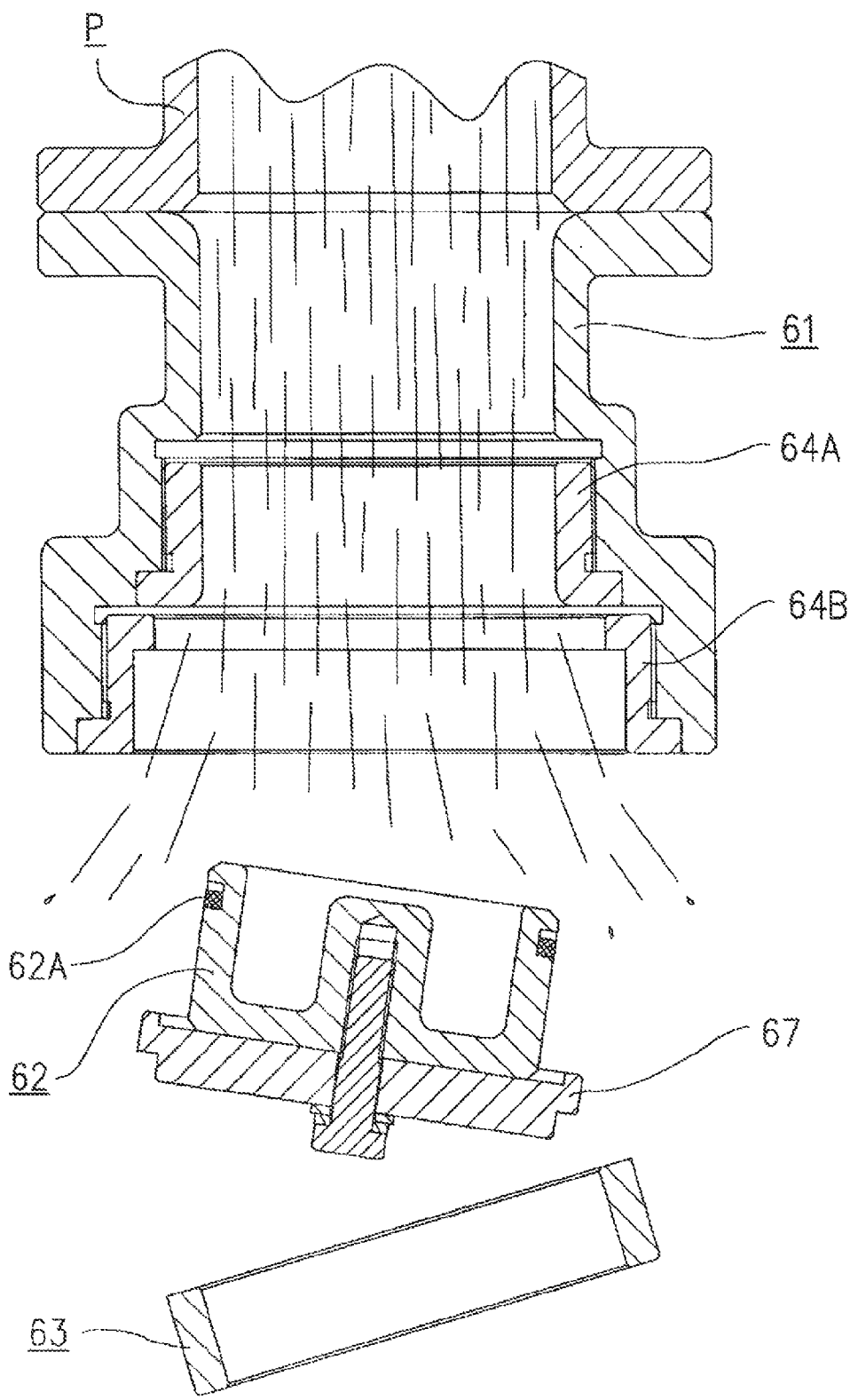
FIG. 8 illustrates an operating state of the valve mechanism of the embodiment 3.
Figure 9:
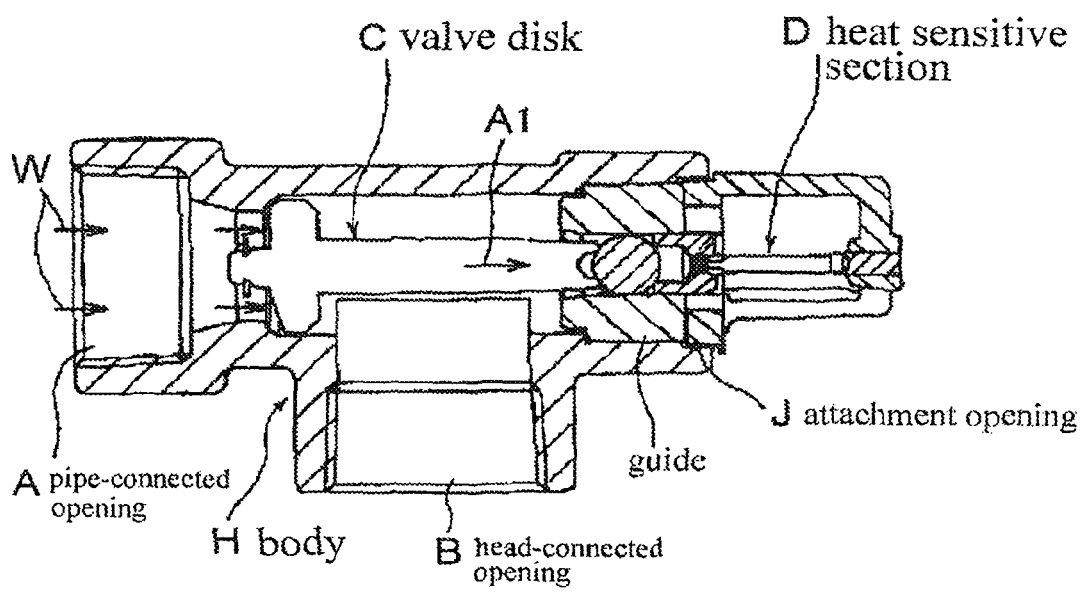
FIG. 9 is a cross-sectional view illustrating a sprinkler head fixture disclosed in the Patent Document 1.

Next, an embodiment 3 will be described with reference to FIGS. 7 and 8. FIG. 7 is a cross-sectional view illustrating a valve mechanism of the embodiment 3. FIG. 8 illustrates an operating state of the valve mechanism of the embodiment 3.

The valve mechanism of the embodiment 3 illustrated in FIG. 7 includes a cylindrical body 61, a piston 62 accommodated in the body 61 and having a cylindrical shape with a bottom, and a cylindrical ring 63 having a diameter larger than that of the piston 62.

The body 61 has a cylindrical shape. In the drawing, the upper portion of the body 61 is connected to a supply pipe P, and the lower portion of the body 61 functions as a discharge opening 66 which discharges a liquid supplied through the supply pipe P. Two cylindrical seat rings 64A and 64B are provided in the body 1.

The seat ring 64A is configured so as to have a diameter smaller than that of the seat ring 64B. The seat ring 64A is disposed at the intermediate portion of the inside of the body 1. The piston 62 is disposed so as to be able to slide on the inner surface of the seat ring 64. An annular sealing member 62A is provided on a surface of the piston 62 to confine a liquid in the supply pipe P, such a surface serving as a sliding surface for the seat ring 64A.

The seat ring 64B is provided inside the body 1 at the side of the discharge opening 66. The cylindrical ring 63 is bonded to the inner surface of the seat ring 64B by using a soluble alloy 65.

A support plate 67 is disposed between the bottom of the piston 62 and an edge face of the ring 63 so as to be bolted to the bottom of the piston 62. One surface of the support plate 67 contacts the edge face of the ring 63, and the ring 63 serves to lock the support plate 67 and the piston 62 with respect to the inside of the body 1.

A flange 68 is formed at the discharge opening 66-side end of the seat ring 64A, and the flange 68 engages a step formed inside the body 1. A flange 69 is also formed at the discharge opening 66-side end of the seat ring 64B, and the flange 69 engages a step formed at the lower edge face of the body 1. Furthermore, an inner flange 70 is formed at the support plate 67-side inner-edge face of the seat ring 64B so as to extend toward the inside of the seat ring 64B, and the inner flange 70 engages with an edge face of the ring 63.

EMBODIMENT 3

Next, the operation of the valve mechanism of the embodiment 3 will be described.

The body 1 is connected to the supply pipe P. The supply pipe P is filled with water, or in the case where a dry-type pipe is employed, the supply pipe P is filled with air. In the cases where fire breaks out and where temperature of environment is then increased to an extremely high level, the soluble alloy 65 that serves to bond the ring 63 to the seat ring 64B is melted to release a locked state between the ring 63 and the seat ring 64B, thereby ejecting the ring 63 from the inside of the body 1 to the outside.

Then, the support plate 67 and cylinder 62 which are held by the ring 63 are ejected from the body 1, the cylinder 62 being fixed to the support plate 67 (see, FIG. 8). Accordingly, the supply pipe P is opened, and water of a water source is discharged from the discharge opening 66, thereby suppressing a state of the extremely high temperature by using the water to prevent the damage from spreading. In the case of employment of a dry-type pipe, water begins to be supplied from a water source, and then the water starts to be discharged from the discharge opening.

INDUSTRIAL APPLICABILITY

The valve mechanism of embodiments of the invention can be provided to a plant or equipment that is involved with a liquid or can be provided to a container or the like that is filled with a liquid. The valve mechanism of embodiments of the invention can be also used as a safety device, which discharges a liquid contained in a plant or a container to the outside before the fluid is expanded resulting from high temperature during fire and then leads to destruction of the equipment or container, thereby preventing explosion.

The invention claimed is:

1. A valve mechanism which opens in response to a high temperature, comprising:
    a cylindrical body attached to an end of a supply pipe connected to a water source and defining a channel for the flow of water in a water flow direction from the supply pipe;
    a stopper positionable at a closed position in the cylindrical body, wherein the stopper blocks the channel and stops the flow of water in the cylindrical body in the water flow direction;
    a support that supports the stopper in the closed position, wherein the support is mounted in the cylindrical body to permit the stopper to be movable from the closed position to an open position wherein the stopper opens the channel to permit the flow of water in the channel in the water flow direction, and wherein the support is mounted such that pressure of the water in the supply pipe tends to move the stopper from the closed position to the open position;
    a locking unit positionable in a locking position in which an engaging surface of the locking unit engages an engaging surface of the support to lock the support in a position wherein the stopper blocks the channel, wherein the locking unit is mounted to be movable to an unlocking position in which the locking unit is located outside of the channel and does not engage the support to lock the support in the position wherein the stopper blocks the channel, whereby pressure of the water in the supply pipe is able to move the stopper from the closed position to the open position so that water flows in the channel,
    wherein the engaging surface of one of the support and the locking unit, that engages the engaging surface of the other of the support and the locking unit, comprises an inclined surface that is inclined obliquely to the water flow direction and that is inclined in a direction such that the pressure of the water in the supply pipe tends to move the locking unit from the locking position to the unlocking position; and
    a heat sensitive section that blocks movement of the locking unit from the locking position to the unlocking position, wherein the heat sensitive section includes a heat sensitive portion that is responsive to the temperature of an environment of the valve mechanism to permit the movement of the locking unit from the locking position to the unlocking position when the temperature of the environment reaches a high temperature, wherein the support is pivotally mounted to the cylindrical body to pivot about a pivot axis, wherein the engaging surface of the support is located opposite to the pivot axis, and wherein the heat sensitive section is provided outside the cylindrical body.

2. The valve mechanism according to claim 1, further comprising a pressing unit adjustably mounted to the support for pressing the stopper to said closed position when the locking unit is positioned in the locking position.

3. The valve mechanism according to claim 1, wherein the heat sensitive portion comprises a low melting point material.

4. The valve mechanism according to claim 1, wherein the heat sensitive section is an enclosed-type sprinkler head.

* * * * *